United States Patent [19]

Nakashima

[11] Patent Number: 4,582,725
[45] Date of Patent: Apr. 15, 1986

[54] PAINTING METHOD BY SPRAYING GLASSY MATERIAL

[76] Inventor: Mikio Nakashima, 5693-3, Asahi-ga-oka, Asahi-ga-oka-cho, Owari-asahi-shi, Aichi-ken, Japan

[21] Appl. No.: 644,426

[22] Filed: Aug. 27, 1984

[51] Int. Cl.$^4$ .............................................. B05D 1/12
[52] U.S. Cl. .................................... 427/193; 427/423; 427/419.6; 427/427; 427/204
[58] Field of Search ............... 427/423, 34, 193, 419.6, 427/427, 204

[56] References Cited

U.S. PATENT DOCUMENTS

| | | | |
|---|---|---|---|
| 2,295,945 | 9/1942 | Fralish | 427/193 |
| 2,321,763 | 6/1943 | McIntyre | 427/193 |
| 2,813,305 | 11/1957 | Robson et al. | 427/193 |
| 2,940,865 | 6/1960 | Sullivan | 427/193 |
| 3,457,102 | 7/1969 | Grekila et al. | 427/423 X |
| 3,788,874 | 1/1974 | Crandall et al. | 427/193 X |

FOREIGN PATENT DOCUMENTS 57-71671  5/1982  Japan .................................. 427/193

*Primary Examiner*—Shrive P. Beck
*Attorney, Agent, or Firm*—Armstrong, Nikaido, Marmelstein & Kubovcik

[57] ABSTRACT

A glassy material spraying and painting method comprising directly spraying a powdered glassy material onto a surface of an object to be painted to form a glassy coat on the surface. It is also possible to perform an undercoat on the surface before the glassy material is sprayed thereon.

3 Claims, No Drawings

PAINTING METHOD BY SPRAYING GLASSY MATERIAL

BACKGROUND OF THE INVENTION

1. Field of the Invention

This invention relates to a painting method by spraying glassy materials, more particularly, but not exclusively, to a method of surface treatment of an object to be painted, such as a building or construction, or building materials.

2. Description of the Prior Art

Surface of reinforced concrete or metal constructions, or mortar surface of constructions, such as buildings, bridges, ships, tanks, or pipe lines or the like are usually not subject to any surface treatment, i.e. they are exposed as they are.

However, buildings located near the seaside, or bridges or towers in the water are usually painted with materials of corrosion or rust prevention. The painting layer and the painted surface are, however, subject to secular or aging or deterioration. The aging or deterioration is accelerated particularly in case of a tunnel or an underground passage where the temperature and the humidity are high and the air is dirty.

Furthermore, in order to repair cracked constructions, it is necessary to first remove the outermost surface layer of the portion of the construction that is to be repaired and then clean it so that a new surface appears, and then to fill cracks. After that, the exposed surfaces can be painted or, if necessary tiles can be applied thereto. However, these are time and labour consuming operations.

SUMMARY OF THE INVENTION

The primary object of the present invention is, therefore, to provide a new surface treating method, i.e. an improved glassy material spraying and painting method which can eliminate the above mentioned drawbacks and which can easily coat surfaces of constructions or buildings, or the like with a glassy material, in which the coated surfaces have an increased durability including high waterproof, high weatherability, high light resistance, high corrosion resistance, high heat resistance, and high insulation.

In order to achieve the object of present invention, according to one aspect of the present invention, there is provided a painting method comprising directly spraying a powdered glassy material onto a surface of a subject to be painted to form a glassy surface coat on the surface.

According to another aspect of the present invention, there is provided a painting method comprising spraying an undercoating material onto a sueface of a subject to be painted to form an undercoat, and then spraying a powdered glassy material onto the undercoat thus obtained to form a glassy surface coat.

DESCRIPTION OF THE PREFERRED EMBODIMENT

The invention will be described below in detail with reference to embodiments.

The powdered glass material used in the present invention may be of any powdered material which can make a glassy coating layer by spraying. The powdered glassy material is, for example, glass powder or a raw material of glass, or frit or a raw material of frit, or glaze.

Glaze is widely used for makng earthenwares or porcelains. In the present invention, preferably, frit which is obtained when a large part of or all of a raw material of frit are fused at one time. Furthermore, a so-called ground mixture in which only soluble raw material forms insoluble frit and the remaining material is used as being raw can be also advantageously used in the present invention.

Glass powder which contains finely powdered particles (below 44 micron) of glass products can be also advantageously used as the glass powder material.

It is also possible to incorporate metal oxide or pigment into the glassy powder material to easily provide a glassy protecting coat colored with a desired color. The addition of metal oxide increases adhesion properties of the glassy coat to the surface of the building, etc.

In one aspect of the invention, the glassy powder material is sprayed directly onto the surface of the object, such as a building or construction to form a glassy surface coat thereon. The surface of the object to be painted can be subject in advance, to a blasting or acid treatment per se known, depending on the kind of material of the building etc., or on the state and conditions of the surface to be coated with glass powder material.

The direct spraying of the glassy powder material onto the portion of the surface that is to be painted can be effected by means of a spray gun in a gas spraying method or an electric spraying method which is well known.

The thickness of the glassy coat can be optionally selected and is usualy about 0.05 to 0.5 mm when the coat is for surface protection. It is even possible to provide a glassy coat having a thickness of about 5 mm.

A number of embodiments of the invention will be shown below.

EXAMPLE 1

Pellets of No. 401 frit by Toyo Frit Industry Co., Ltd. were ground by a grinder to obtain 98 % (74 micron) frit powders below 200 meshes. The frit powders thus obtained were directly flame-sprayed onto a wall surface of cement mortar to form a glassy surface coat having a thickness of about 0.2 mm.

EXAMPLE 2

The frit powders which were used in the example 1 mentioned above were directly flame-sprayed onto a wall surface of asbestos slate which has been subjected to a blasting treatment, to form a glassy surface coat having a thickness of about 0.4 mm.

EXAMPLE 3

98% glass powders of soda glass (below 44 micron) were flame-sprayed onto a wall plate of aluminum which has been subjected to (or without) a blasting treatment to form a glassy coat having a thickness of about 0.5 mm.

EXAMPLE 4

The frit powders used in the example 1 were flame-sprayed onto an inner surface of a tank made of iron plate, which inner surface has been subjected to an acid treatment by applying hydrochloric acid or sulfuric acid thereto after (or without) a blasting treatment, so that a glassy surface coat having a thickness of about 0.2 mm was formed on the inner surface of the tank.

As mentioned before, the glassy powder material can be sprayed either directly onto the surface of an object to be painted or after the surface is subjected to a blasting treatment or an acid treatment if necessary. When the object to be painted has a cement surface, the glassy powder material can be advantageously sprayed onto the surface after the latter is preheated above 100° C.

This pretreatment, i.e. preheating of the surface causes the moisture contained in the cement surface to be removed, which moisture otherwise would have a bad influence on adhesion properties between the glassy coat and the cement surface, thus resulting in an increase of the possibility of secular separation of the glassy coat from the cement surface. The cement surface is usually preheated to 150° C. to 250° C. by means of a gas burner or the like.

EXAMPLE 5

Immediately after the plate surface of cement mortar was preheated at 150° C. by a gas burner, the frit powders used in the above mentioned example 1 were directly flame-sprayed onto the cement mortar plate surface to form a glassy surface coat having a thickness of about 0.2 mm.

EXAMPLE 6

The wall surface of asbestos slate was first preheated at 200° C. by a gas burner after blasting treament. After that, the glassy powders used in the afore mentioned example 3 were flame-sprayed onto the preheated wall surface to form a glassy surface coat having a thickness of about 0.4 mm. In this example, the surface of the glassy coat thus obtained may be polished or ground to finish the same, if necessary.

Furthermore, when the surface to be painted is made of corrosive metal, a vaporability rust preventive is preferably applied to the surface.

EXAMPLE 7

An inner surface of a tank of iron plate was first subjected to sandlasting treatment. After that, an alcoholic solution containing 10% of dicyclohexyl ammonium nitrite powder was sprayed and applied to the sandblasted iron surface of the tank. The surface thus coated with the rust preventative was then heated at 200° C. to 250° C. by a gas burner to sublimate the rust preventative. Finally, the frit powders used in the above mentioned example 1 were flame-sprayed onto the inner surface of the tank to form a glassy surface coat having a thickness of about 0.2 mm.

According to another aspect of the present invention, an undercoating material is sprayed in advance onto the surface to be painted, prior to spraying of the glassy powder material for the surface coat, unlike the above mentioned examples. Namely, according to a second aspect of the present invention, there is provided a glassy material spraying and painting method comprising spraying an undercoating material onto a surface of a subject to be painted to form an undercoat, and then spraying a powdered glassy material onto the undercoat thus obtained to form a glassy surface coat.

The undercoat ensures a close contact adhesion between the undercoat and the glassy surface coat to be formed thereon later. The undercoating metal is preferably material, inorganic material, or glassy material. Example of the undercoating material are given below. Metal of which the undercoat is made is copper, cobalt, manganese, nickel, titanium, zinc, chromium, iron, molybdenum, tungsten, lead, tin, magnesium, or silicon, or its compound, or its mixture, or its compounded mixture or its alloy, or carbon steel. The metal undercoat has, preferably, a thickness of about 0.05 to 0.2 mm.

EXAMPLE 8

The wall surface of asbestos slate was subjected to a blasting treatment. A copper wire was sprayed by an electrodeposition method to the blasted wall surface to form a metalic undercoat. After that, glassy powder material was flame-sprayed onto the wall surface to form a glassy coat of a thickness of about 0.2 mm.

Inorganic material of which the undercoat is made is, preferably, wollastonite, danburite, or gehlenite, or its mixture, or zirconia, calcium, silica, lithium, antimony, barium, or strontium, or its mixture, or its compounded mixture.

Among them, a mineral element containing calcium, and silicon, such as wollastonite, danburite, or gehlenite or the like gave the best result. In particular, wollastonite was the best binder, since it is easily obtainable and has a capillary crystal. A mixture of lime and silica stone can be also advantageously used as a binder.

EXAMPLE 9

Wollastonite of 400 meshes (more than 95%) ($SiO_2$...49%, CaO...43%, $Al_2O_3$...1%) was flame-sprayed onto a concrete wall surface which has been subjected to a blasting treatment to form a binding undercoat of about 0.1 mm thickness. After that, glassy powders were flame-sprayed onto the undercoat to form a glassy surface coat having a thickness of about 0.2 mm.

EXAMPLE 10

A mixture of 200 meshes or more (98%) containing 35 parts of special grade calcium carbonate ($CaCO_3$) and 45 parts of silica ($SiO_2$) was flame-sprayed onto a mortar wall surface to form a binding undercoat having a thickness of about 0.1 mm. After that, frit powders were flame-sprayed onto the undercoat to form a glassy surface coat having a thickness of about 0.2 mm on the undercoat. In this example, it is advisable to form a glassy undercoat when the surface to be painted is made of metal. The undercoat is, preferably, made of glaze or, particularly, frit, as mentioned above, but may be made of a glassy material identical to that of the surface coat. In case of the latter alternative, the surface is painted twice with a glassy materal.

EXAMPLE 11

The inner surface of a tank made of an iron plate was first subjected to acid treatment by applying nickel sulfate thereto after (or without) a blasting treatment of the inner surface. After that, an undercoating material was flame-sprayed onto the inner surface to form an undercoat of about 0.1 mm thickness. Frit powders used in the example 1 mentioned before were flame-sprayed onto the undercoat to form a glassy surface coat having a thickness of about 0.2 mm. It should be noted that the undercoating material should be flame-sprayed as soon as the acid treatment is completed, since the surface subjected to the acid treatment tends to be coated with an oxide layer.

The undercoating material used in the example 11 was as follows. 15.2 parts of silica (by weight), 35.5 parts of feldspar, 32.4 parts of borax, 8.1 parts of calcined soda, 3.0 parts of Chile saltpeter, 5.1 parts of fluorite, 0.5 parts of cobalt oxide, and 0.2 parts of manganese dioxide were frit fused to form a raw frit. To 100 parts by weight of the raw frit, 0.5 parts of borax, 0.5 parts of silica, and 0.3 parts of ammonium carbonate (each by weight) were added and ground, so that 200 meshes of frit (more than 98%) was obtained.

It is also possible to add metal to the undercoating material.

I claim:

1. A painting method comprising spraying an undercoating material on a surface to be painted, said undercoating material being wollastonite, danburite, or gehlenite, or a compound thereof, and then spraying a powdered glassy material onto the undercoat thus obtained to form a glassy surface coat.

2. A painting method according to claim 1, wherein said powdered glassy material is a powdered glass.

3. A painting method according to claim 1 wherein said powdered glassy material is frit.

* * * * *